(No Model.)
W. A. SCOTT.
GATE.
No. 427,119. Patented May 6, 1890.
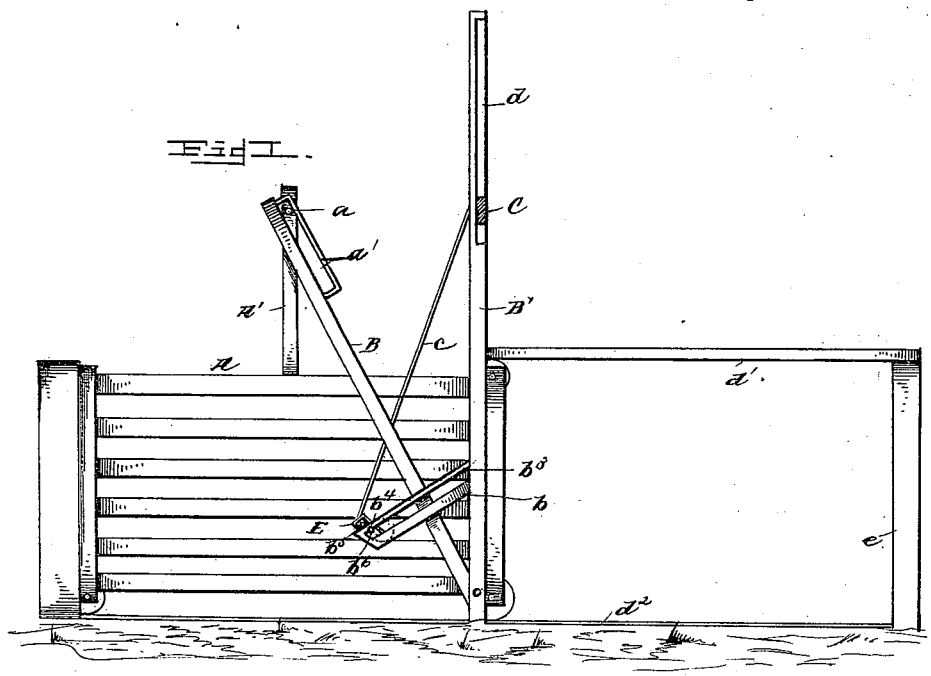
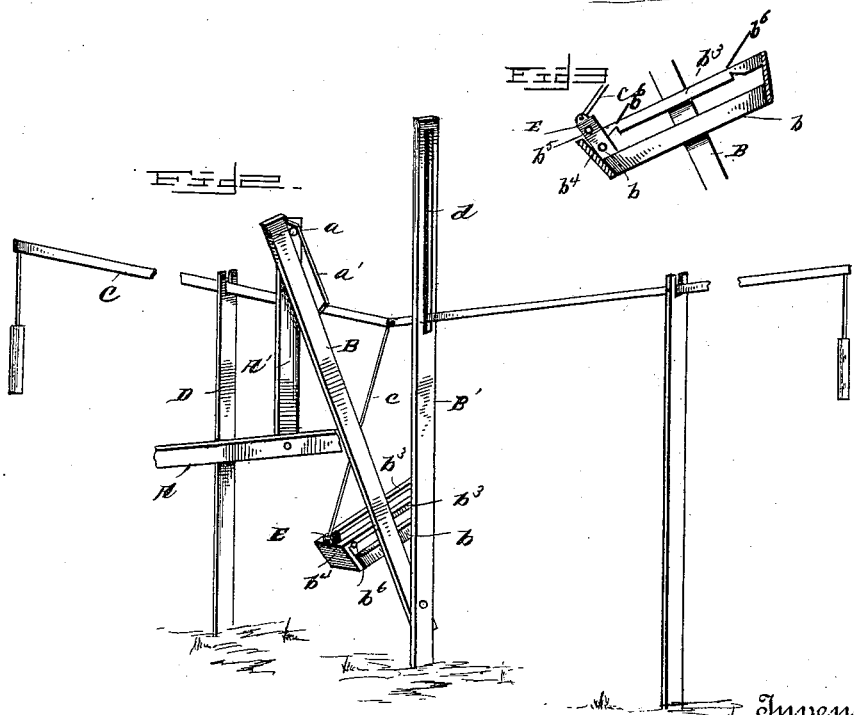
Witnesses
Mercer Ayers
Paul W. Stevens
Inventor
William A. Scott
By Ayers & Co
Attorneys

UNITED STATES PATENT OFFICE.

WILLIAM A. SCOTT, OF EDGERTON, MISSOURI.

GATE.

SPECIFICATION forming part of Letters Patent No. 427,119, dated May 6, 1890.

Application filed January 2, 1890. Serial No. 335,662. (No model.)

*To all whom it may concern:*

Be it known that I, WILLIAM A. SCOTT, a citizen of the United States of America, residing at Edgerton, in the county of Platte and State of Missouri, have invented certain new and useful Improvements in Gates, of which the following is a specification, reference being had therein to the accompanying drawings.

My invention pertains to an improvement in gates; and it consists in the peculiar construction, combination, and arrangement of the parts, as hereinafter more fully shown and described.

In the accompanying drawings, Figure 1 is a side elevation of my invention, showing the gate when closed. Fig. 2 is a detail perspective view of the operating mechanism, parts being broken away. Fig. 3 is a sectional elevation of the guide-box, parts being broken away.

In the embodiment of my invention I employ a gate A, which is provided with an upwardly-extended bar A' near its center, which carries pin $a$ at its upper end, engaging slot $a'$ at the top of lever B, which is pivoted near the ground to upright B', which is situated at the side of the gateway.

Guide-box $b$ consists of two parallel rods or bars $b^3$ $b^3$, having notches provided in their under side near each end thereof.

Attached to the ends of the operating-levers C is rod or bar $c$, having at its lower end catch E, consisting of two rods $b^4$ $b^5$, projecting on either side thereof, one resting above and the other one below the rods or bars $b^3$ $b^3$, in the under side of which, near each end thereof, notches are provided. Thus it will be seen that catch E is allowed to slide from end to end, thus engaging notch $b^6$, and that it is released therefrom when the gate is opened or closed. The rod or bar $c$ is secured to operating-levers C, extending some distance from the gate on each side thereof, said levers being pivoted to posts or uprights D, their ends being pivotally connected in slot $d$ in the upper portion of upright R'.

To the top and bottom of the rear and front posts of the gate rollers are secured, which operate in tracks $d'$ $d^2$, track $d^2$ extending along the level of the ground the whole length of the gate, and the upper track $d'$ extends from the upright B' to the rear post $e$ of the gate-frame. Thus it will be seen that by pulling upon the levers C (supposing the gate to be closed) the ends of the operating-levers will be caused to rise in the slot where secured, thus causing the lever B to perform a circular movement, carrying with it the gate, which is attached to the lever by the pivot or pin. Thus it will be seen the gate is opened or closed.

Thus constructed a very simple, inexpensive, and efficient gate is produced.

Having thus fully described my invention, what I claim, and desire to secure by Letters Patent, is—

In a gate, the post having the slot therein to serve as a guide for the operating-levers, the rod pivoted to the operating-levers at its upper end and to the catch at its lower end, the lever carrying the guide-box at its lower end, and the central vertical upright having the pin projected horizontally therefrom and operating in a slot formed at the top of the pivoted lever, substantially as shown and described.

In testimony whereof I affix my signature in presence of two witnesses.

WILLIAM A. SCOTT.

Witnesses:
I. P. HOPKINS,
J. H. BRUCE.